United States Patent [19]

Takaoka et al.

[11] Patent Number: 4,729,097
[45] Date of Patent: Mar. 1, 1988

[54] SALES REGISTRATION APPARATUS WITH MEANS TO TRANSFER CONTROL PROGRAM AND SALES REGISTRATION DATA BETWEEN INDIVIDUAL UNITS

[75] Inventors: Yasushi Takaoka; Yuji Iida, both of Shizuoka, Japan

[73] Assignee: Tokyo Electric Co., Ltd., Tokyo, Japan

[21] Appl. No.: 730,350

[22] Filed: May 3, 1985

[30] Foreign Application Priority Data

May 11, 1984 [JP] Japan .................................. 59-92904
May 11, 1984 [JP] Japan .................................. 59-92905

[51] Int. Cl.⁴ ............................................ G06F 15/20
[52] U.S. Cl. ...................................... 364/405; 364/900
[58] Field of Search ................ 364/405, 900 MS File

[56] References Cited

U.S. PATENT DOCUMENTS

| | | | |
|---|---|---|---|
| 3,330,947 | 7/1967 | Alpert et al. | 364/405 |
| 4,186,439 | 1/1980 | Shimura et al. | 364/405 |
| 4,213,179 | 7/1980 | Hamano | 364/405 |
| 4,419,738 | 12/1983 | Takahashni | 364/405 |
| 4,502,120 | 2/1985 | Ohnishi | 364/405 |

FOREIGN PATENT DOCUMENTS 2109972 6/1983 United Kingdom .
2128005A 4/1984 United Kingdom .

*Primary Examiner*—Jerry Smith
*Assistant Examiner*—Gail Hayes
*Attorney, Agent, or Firm*—Frishauf, Holtz, Goodman & Woodward

[57] ABSTRACT

A sales registration apparatus includes first and second coupling units detachably coupled to each other, a keyboard, connected to the first coupling unit and including numeral setting keys and department keys, for supplying key-in signals through the first coupling unit in accordance with a key operation in response to key-out signals supplied through the first coupling unit, first memory, and first control unit, coupled to the second coupling unit, for supplying the key-out signals through the second coupling unit and for writing a control program and sales registration data in the first memory in response to the key-in signals supplied through the second coupling unit. The sales registration apparatus further has second memory for storing data corresponding to key-in signals program, operation mode setting units, third coupling unit detachably coupled to the second coupling unit, and data setting device, coupled to the third coupling unit, including second control unit for sequentially supplying key data from the second memory to the first control unit through the third and second coupling units in response to the key-out signals supplied through the third coupling unit in a first operation mode.

13 Claims, 20 Drawing Figures

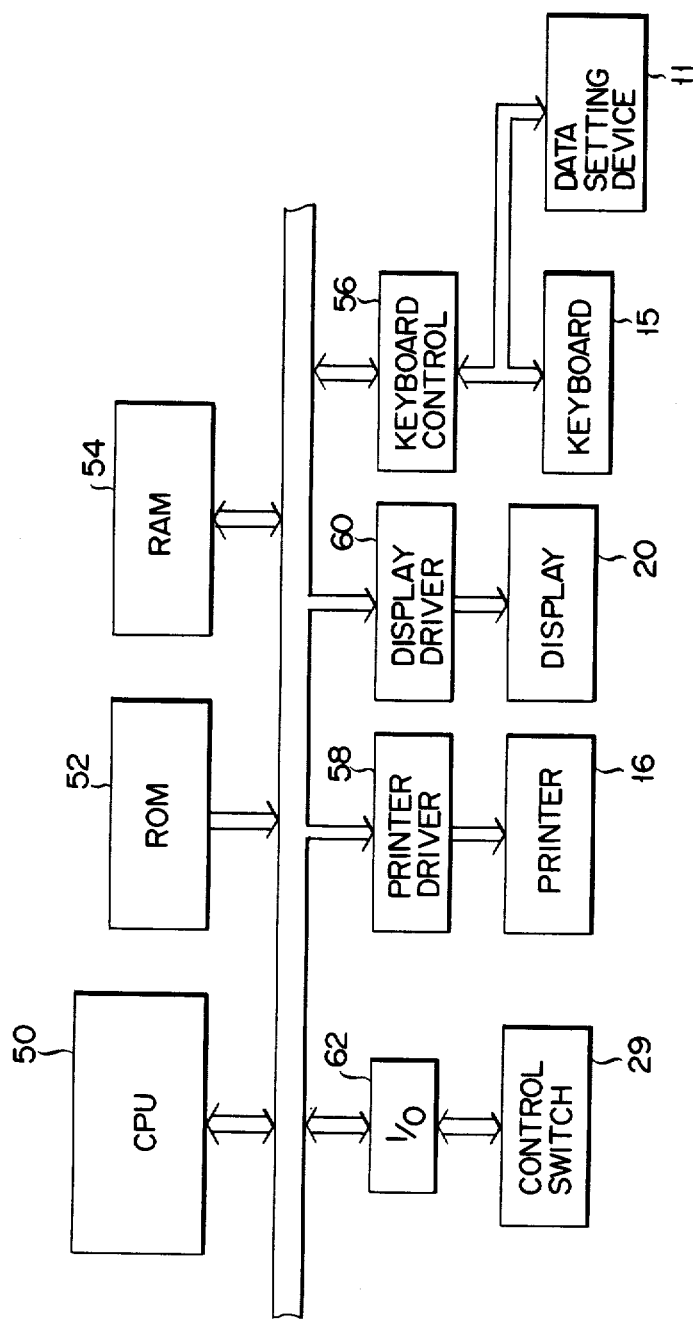

F I G. 14
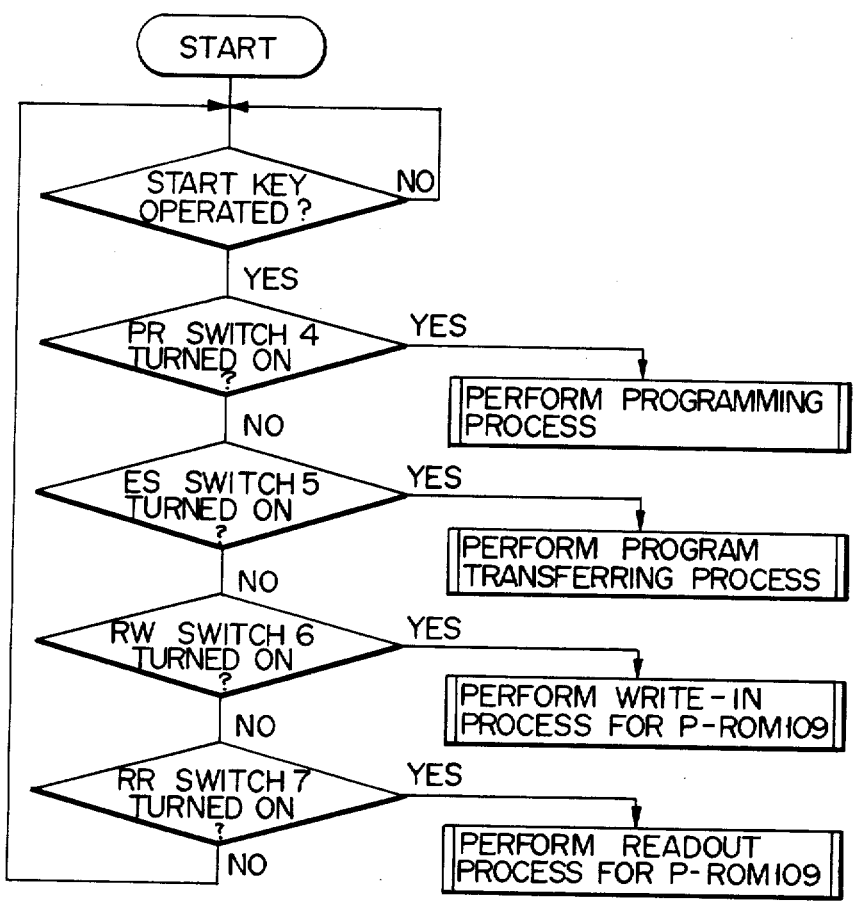

SALES REGISTRATION APPARATUS WITH MEANS TO TRANSFER CONTROL PROGRAM AND SALES REGISTRATION DATA BETWEEN INDIVIDUAL UNITS

BACKGROUND OF THE INVENTION

The present invention relates to a sales registration apparatus which performs sales registration processing with respect to items for sale in accordance with various fixed control data set in an internal memory and, more particularly, to a sales registration apparatus which can simplify the operation for setting various fixed control data in the memory.

In sales registration apparatuses such as terminals of a POS (Point-Of-Sales) system in large retail stores, e.g., department stores, supermarkets and the like and electronic cash registers in small retail stores, sales registration files for registering sales data of items such as price, number, department code data, and the like entered by operating registration keys provided on a keyboard are stored in an internal memory unit.

Even if the sales registration apparatuses having the same specifications are used, contents of these sales registration files differ in accordance with a size of the POS system, types of items to be sold, a difference in methods for totaling sales or in demands of users. Generally, sales registration apparatuses are manufactured to have the same specifications, and when the apparatus is delivered or located on a certain sales floor designated by the user, the sales registration files required by the user are set in the internal memory of the apparatus.

However, in order to reduce manuacturing cost, the sales registration apparatus of this type does not comprise a specific interface for automatically inputting various fixed control data such as department code, name of item, price for each department, item code which constitute the sales registration files. Therefore, when the fixed data are set in the internal memory, they must be entered by operating keys provided on a keyboard for each step in a predetermined procedure. For this reason, when a plurality of sales registration apparatuses are to be delivered to a single user or when those having the same registration file content are delivered to different users, fixed control data must be set by operating keys on the keyboard for each apparatus. As a result, the overall time required for setting fixed control data is increased, and fixed control data can be erroneously set.

SUMMARY OF THE INVENTION

It is an object of the present invention to provide a sales registration appartus in which fixed control data stored in a detachable type data setting device can be transferred to an internal memory.

In order to achieve the above object of the present invention, there is provided a sales registration apparatus comprising first and second coupling units detachably coupled to each other; a keyboard, coupled to the first coupling unit and including numeral setting keys and department keys, for supplying through the first coupling unit key-in signals corresponding to a key operation in response to key-out signals supplied through the first coupling unit; a first memory; a first control unit, coupled to the second coupling unit, for supplying the key-out signals through the second coupling unit and for writing a control program and sales registration data in the first memory in response to the key-in signals supplied through the second coupling unit; a second memory for sequentially storing key data corresponding to key-in signals; an operation mode setting section; a third coupling unit detachably coupled to the second coupling unit; and a second control unit, coupled to the third coupling unit, for sequentially transferring the key data from the second memory to the first control unit through the third and second coupling units in a programming mode to cause the key data to be stored in the first memory.

According to the present invention, when the data setting device is coupled e.g. to a cash register and is set in a programming mode, key data stored in the second memory of the data setting device can be transmitted to and stored in the first memory of the cash register. Therefore, the identical key data can be easily and quickly stored in the memory of the cash register.

BRIEF DESCRIPTION OF THE DRAWINGS

FIG. 4 is a block diagram of a control circuit of the cash register shown in FIG. 2;

FIGS. 14 to 19 are flow charts for explaining an operation of the control circuit of the data setting device shown in FIG. 12.

DETAILED DESCRIPTION OF THE PREFERRED EMBODIMENTS

Figure 1:
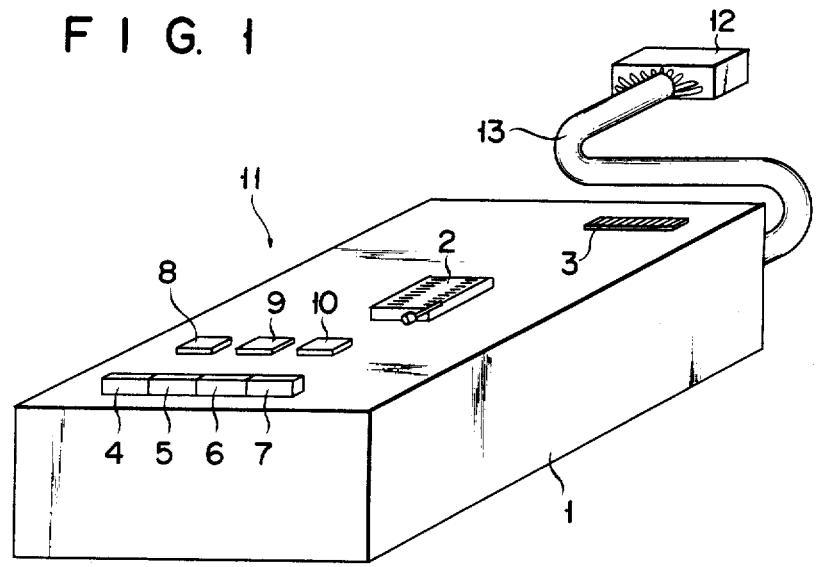
FIG. 1 is a perspective view of a data setting device used in a sales registration apparatus according to an embodiment of the present invention.

FIG. 1 is a perspective view of a data setting device 11 of a sales registration apparatus according to an embodiment of the present invention. The device 11 comprises a box-shaped casing 1 containing various electronic components therein, four lock-type operation switches 4 to 7, three push-button type control keys 8 to 10, a socket 2 to which a programmable read-only memory (P-ROM) is detachably connected, and connecting terminal unit 3 provided on an upper surface of the casing 1 and detachably coupled to a keyboard of an electronic cash register through a cable.

The four operation switches are a program (PR) switch 4 for designating an operation mode of writing a sales registration file or a program to a key code memory, a setting (ES) switch 5 for designating an operation mode of setting the program to the cash register a write (RW) switch 6 for designating an operation mode of writing a stored content of the key code memory in the P-ROM, and a read (RR) switch 7 for designating an operation mode of reading out a key code written in the P-ROM, respectively. The three control keys are a start (ST) key 8 for designating the start of the respective operations, a stop (SP) key 9 for designating a forced stop of the operations, and an all clear (AC) key 10 for clearing a storage content of a storage unit such as the key code memory. A connecting terminal unit 12 is detachably connected to the connecting terminal of a keyboard control circuit of the cash register through a cable 13.

Figure 2:
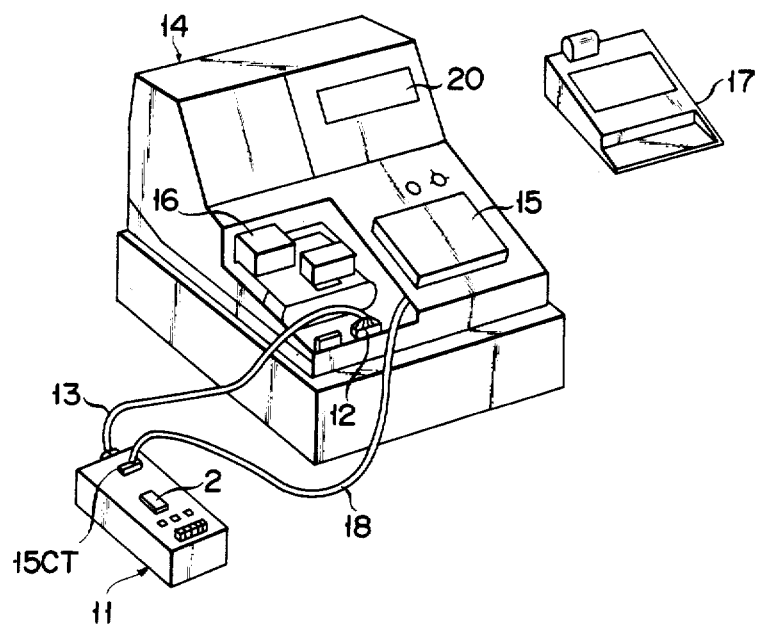
FIG. 2 is a schematic view of the sales registration apparatus comprising a cash register and the data setting device connected to each other.

FIG. 2 shows a state wherein the program setting device 11 is connected to a cash register 14. When a program is set in the data setting device 11 or cash register 14, a cover 17 is removed covering a printer 16 adjacent to a keyboard 15 on a front surface of the register 14. A connecting terminal unit 15CT which is connected at one end to a cable 18 extending from a back surface of the keyboard 15 and which is usually connected at the other end to the connecting terminal unit of the keyboard control circuit is disconnected from the connecting terminal unit of the keyboard control circuit and then connected to the terminal unit 3 of the device 11. The connecting terminal unit of the keyboard control circuit is connected to a connecting terminal unit 12 of the device 11. Note that a display unit 20 of the cash register 14 is used to display a unit price or a total price.

Figure 3:
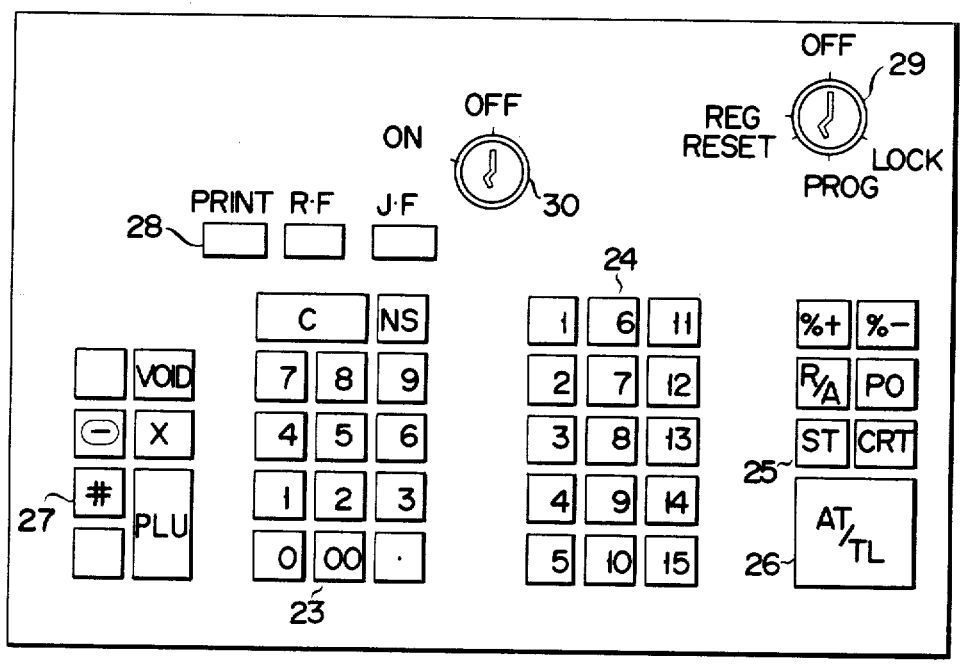
FIG. 3 shows a keyboard of the cash register shown in FIG. 2.

As shown in FIG. 3, the keyboard 15 comprises numeral setting keys 23 for setting sales prices and the number of items, department keys 24 indicating classifications of the items, a sub total key 25, a charge/cash total key 26 for calculating a total amount of the sale, various function keys 27 such as cancel and PLU keys, a print switch 28 for designating a print output of the fixed control data set in the storage unit, and the like. Furthermore, the keyboard 15 is provided with a control switch 29 and a power switch 30 which are operated by a key. The control switch 29 is used to designate respective operations of "registration", "program", "reset" so as to cause a central processing unit to execute them. In the "registration" operation, department codes of the items and sales data of a sales price are registered in a sales registration file formed in the storage unit, and the total amount of the sale is calculated so that the result is printed on journal paper by the printer 16. In the "program" operation, fixed control data such as the department code, the unit price determined for each department, names of items and the like are preset in the sales registration file. Furthermore, in the "reset" operation, for example, when the operations for a day is completed, a total sales amount and the total number of items sold accumulated in the sales registration file is printed on the journal paper as a calculation report.

FIG. 4 is a block diagram of the sales registration apparatus according to the embodiment of the present invention. The apparatus comprises a central processing unit (CPU) 50, a read-only memory (ROM) 52 for storing a program to be executed by the CPU 50, and a random-access memory (RAM) 54 for storing key code data and the like corresponding to key-in signals supplied from the keyboard 15 of the cash register 14. Furthermore, the keyboard 15, the printer 16, the display unit 20, and the control switch 29 are connected to the CPU 50 respectively through a keyboard control circuit 56, a printer driver 58, a display driver 60 and an I/O port 62. As will be described later, the data setting device 11 is detachably coupled between the keyboard 15 and the control circuit 56.

Figure 5:
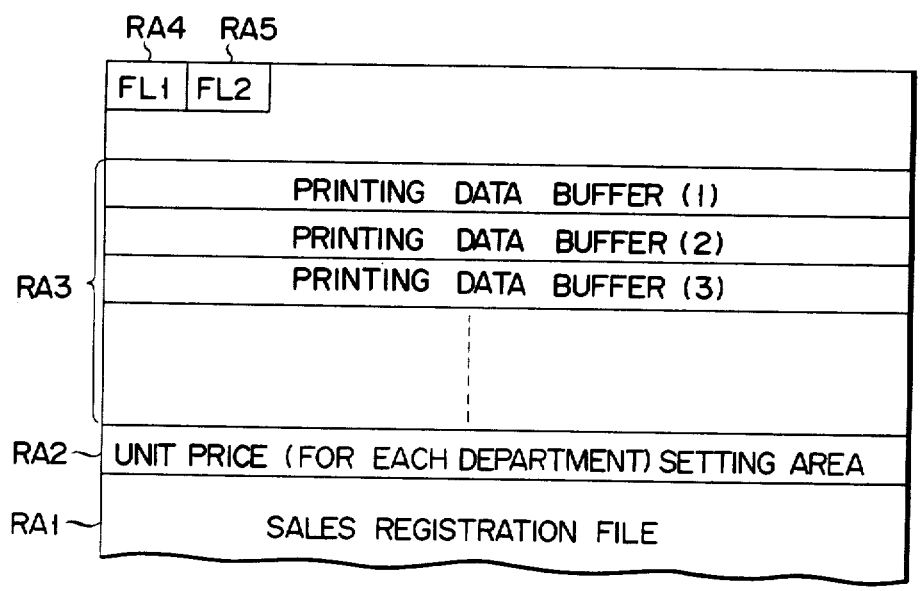
FIG. 5 is a memory map of a RAM used in the control circuit shown in FIG. 4.

As shown in FIG. 5, the RAM 54 includes a sales registration file RA1 for totaling sales data supplied by key operations on the keyboard 15, e.g., for each department code, a unit price (for each department) setting area RA2 for storing a unit price determined for each department set in respective department code areas in the file RA1, and printing data buffers RA3 for temporarily storing data for one line to be printed on the journal paper by the printer 16. In addition to these, the RAM 54 includes a memory area RA4 for storing a delay flag FL1 which designates a delay time T1 when the keyboard 15 is directly connected to the control circuit 56, that is, when the connecting terminal unit 15CT is directly connected to that of the circuit 56, and a memory area RA5 for storing a delay flag FL2 which designates a delay time T2 when the connecting terminal unit 12 of the device 11 is connected to the circuit 56. Note that the time T2 is set to be longer than the time T1.

Figure 6:
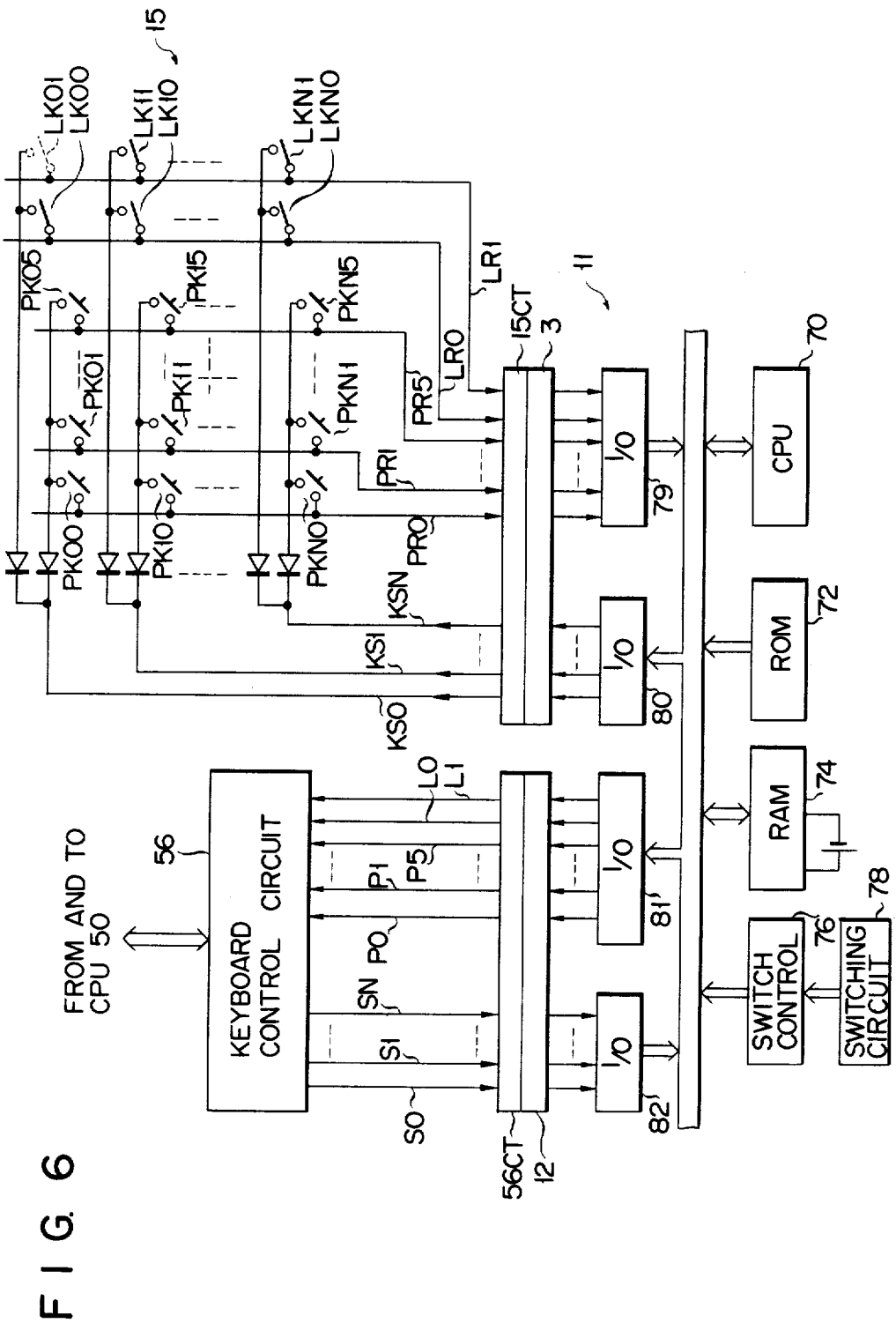
FIG. 6 is a circuit diagram of the keyboard, a keyboard control circuit, and a control circuit of the data setting device.

FIG. 6 is a circuit diagram showing a main part of the sales registration apparatus when the device 11 is connected to the circuit 56. The device 11 comprises a CPU 70, a ROM 72 for storing a program for the CPU 70, a RAM 74 connected to a back-up battery and having an internal key code memory for storing key data corresponding to key-in signals from the keyboard 15 as the fixed control data in a key code format, a switch control unit 76 receiving a command signal from a switching circuit 78 including the above-mentioned control switches 4 to 7, and I/O ports 79 to 82.

(N+1) key-out signals S0 to SN generated from the circuit 56 are supplied to the I/O port 82 through a connecting terminal unit 56CT provided on the circuit 56, and the connecting terminal unit 12 provided on the device 11. Each of key-out signals KS0 to KSN having substantially the same waveform as that of the key-out signals S0 to SN supplied to the I/O port 82 is supplied from the I/O port 80 to corresponding commonly connected nodes of push keys PK00 to PKN5 arranged in a [6×(N+1)]-matrix form and lock keys LK00 to LKN1 arranged in a [2×(N+1)]-matrix form in the keyboard 15 through the connecting terminal 3 and 15CT.

The push keys correspond to registration keys such as the keys 13, 14, 15 and the like, the lock key LK01 corresponds to an imaginary key which is not actually present, and the lock key LK11 corresponds to the print switch 28. Other lock keys correspond to the control key 29 for designating various operations.

Assume now that the program switch 4 is turned ON, and that key-in signals PR0 to PR5 obtained from the keys PK00 to PKN5 and key-in signals LR0 and LR1 obtained from the lock keys LK00 to LKN1 are supplied to the I/O port 79 in the device 11 through the connecting terminal units 15CT and 3. Then, key-in signals P0 to P5, L0 and L1 having substantially the same waveform as that of the key-in signals PR0 to PR5, LR0 and LR1 are supplied from the I/O port 81 of the device 11 to the circuit 56 through the connecting terminal units 12 and 56CT. Note that the data setting device is so designed that, when the key-out signal S0 generated from the circuit 56 is at LOW level, the CPU 70 of the device 11 supplies the signal L1 of LOW level to the circuit 56 through the I/O port 81 as if the imaginary lock key LK01 were turned on. Simultaneously, key code data corresponding to the operation states of the push keys and the lock keys of the keyboard 15 represented by the key-in signals PR0 to PR5, LR0 and LR1 from the keyboard 15 is written in the key code memory of the RAM 74 in each key operation, and thus a plurality of key code data are successively written in the key code memory in accordance with an operation procedure of the keyboard 15.

Figure 7A:
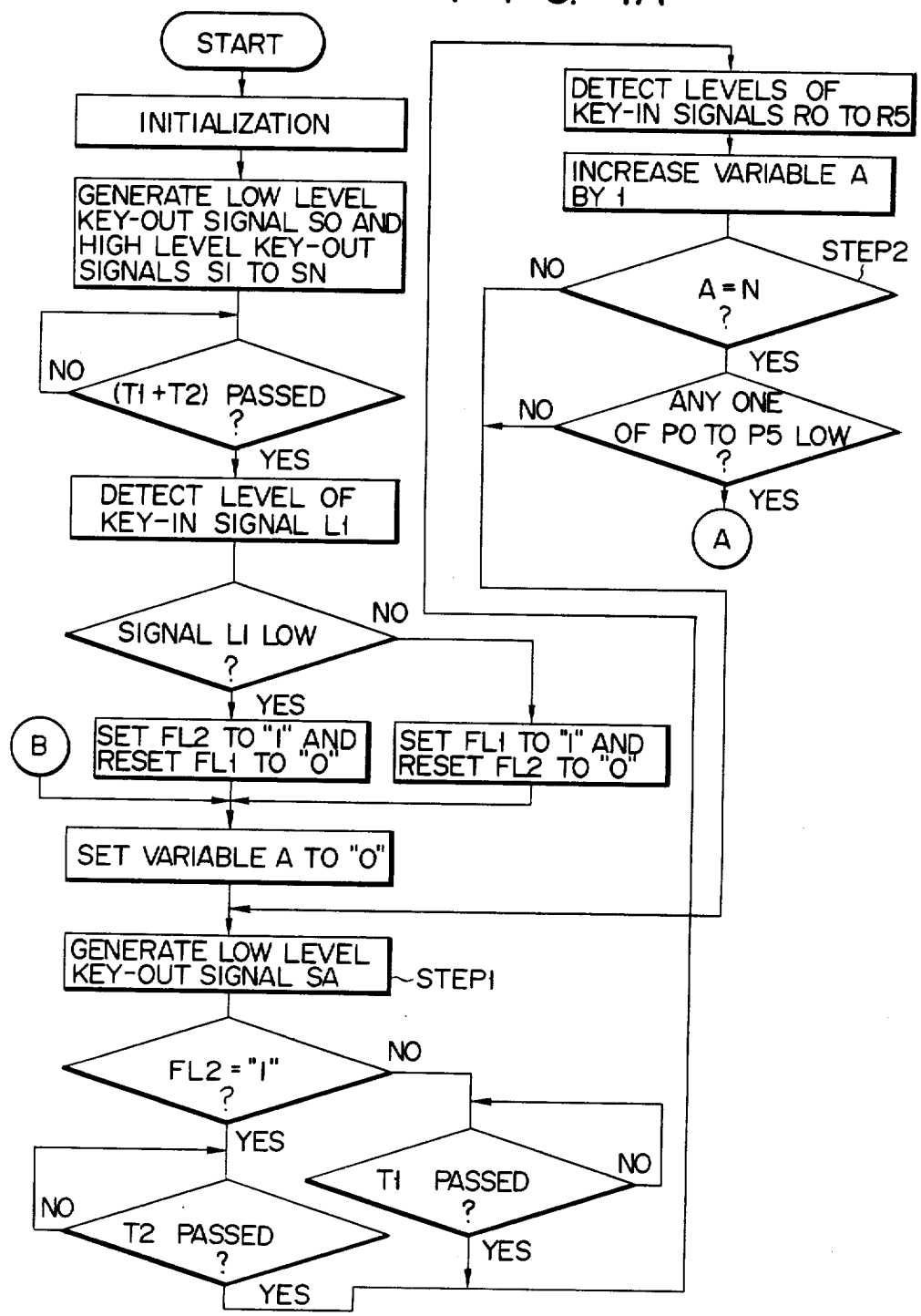
FIGS. 7A, 7B and 8 are flow charts for explaining an operation of the control circuit of the cash register shown in FIG. 4.
Figure 7B:
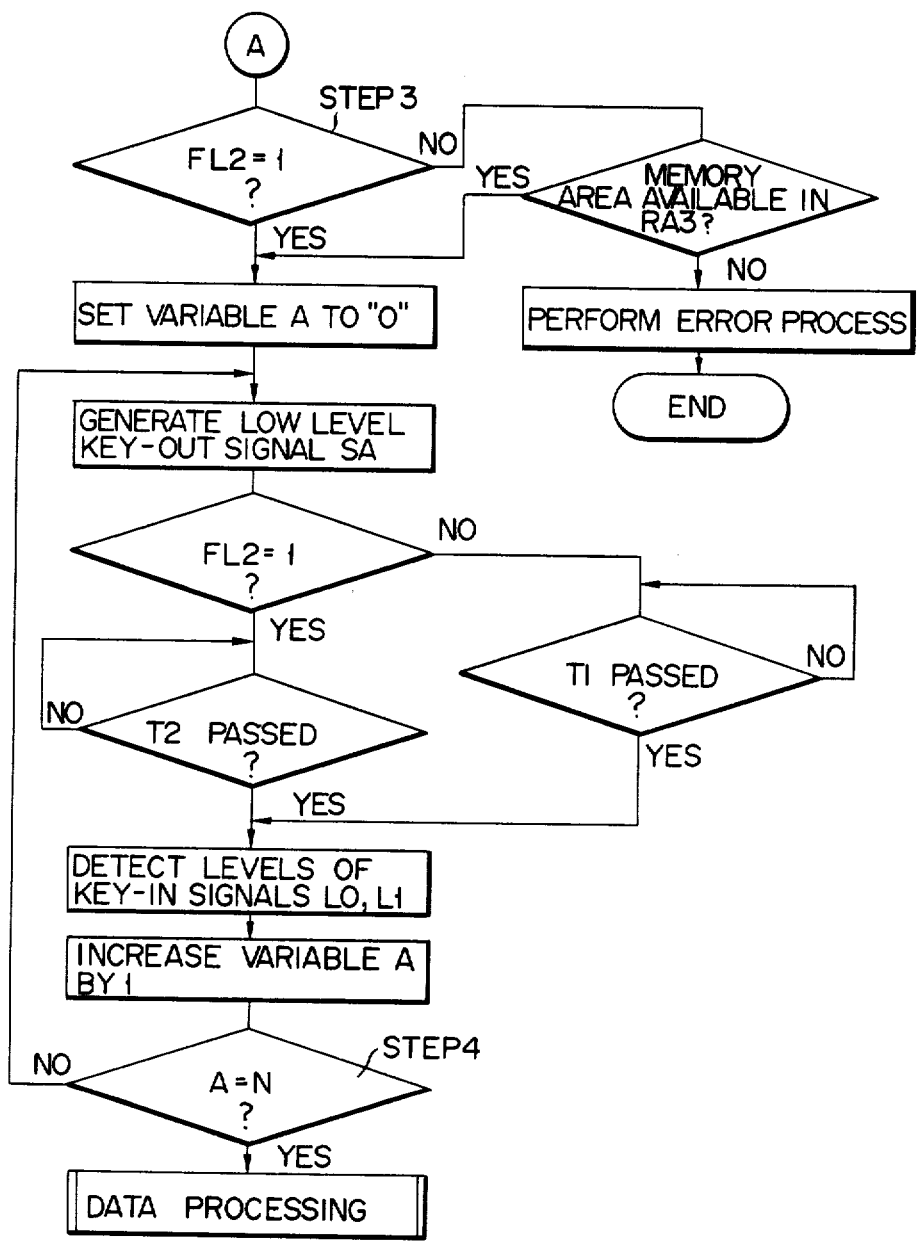
Figure 8:
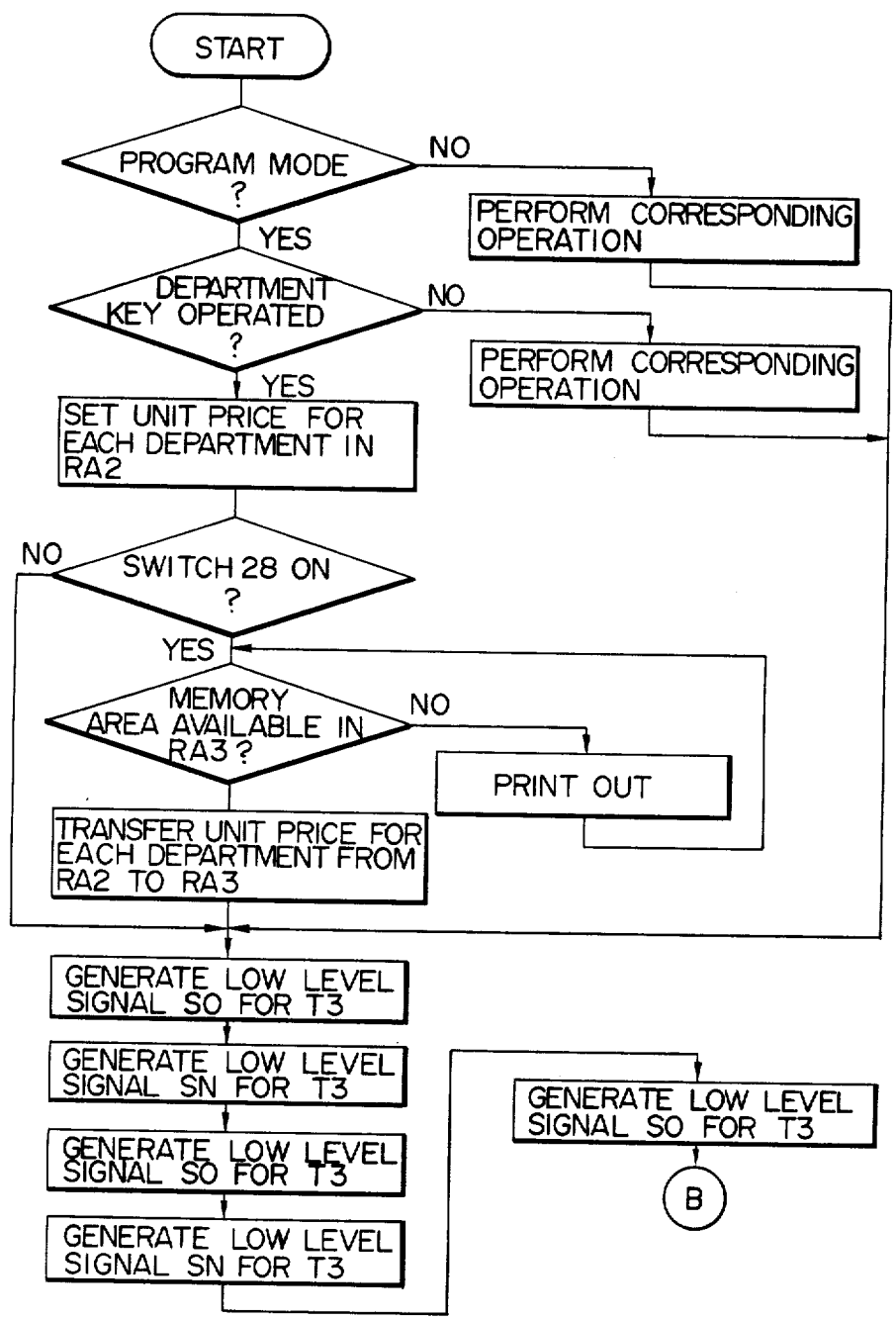

With this arrangement, when the power switch 30 is turned on and the cash register 14 and the data setting device 11 are supplied with a power source voltage, the CPU 50 of the apparatus shown in FIG. 4 executes the operation of setting the fixed control data in the RAM 54 in accordance with the flow charts shown in FIGS. 7A, 7B and 8. When the switch 30 is turned on, the CPU 50 performs initialization step with respect to respective storage units, and thereafter sets the key-out signal S0 to LOW level and the key-out signals S1 to SN to HIGH level which are supplied from the keyboard control circuit 56. When a total time (T1+T2) of the delay flags FL1 and FL2 in the memory areas RA4 and RA5 of the RAM 54 has passed, the CPU 50 detects the level of the key-in signal L1 on a line to which the imaginary lock key LK01 is connected among the key-in signals supplied to the circuit 56. If, at this time, the CPU 50 detects that the signal L1 is at LOW level, since the LOW level signal L1 can be generated at this time from the device 11, the CPU 50 determines that the device 11 is connected to the circuit 56. Thus, the CPU 50 sets "1" in the delay flag FL2 of the area RA5, and resets the delay flag FL1 of the area RA4 to "0". However, when the key-in signal L1 is at HIGH level, since this HIGH level key-in signal can be supplied at this time from the keyboard 15 through the terminal unit 15CT and 56CT without passing through the device 11, the CPU 50 determines that the device 11 is not connected to the circuit 56. Thus, the CPU 50 resets the flag FL2 of the area RA5 to "0" and sets "1" in the flag FL1 of the area RA4.

After the CPU 50 determines whether or not the device 11 is connected to the circuit 56, the CPU 50 sets a variable A indicating the number of one of the signals S0 to SN at "0". In STEP 1, the CPU 50 sets the Ath key-out signal SA at LOW level which is then supplied from the terminal unit 56CT. Then, the CPU 50 checks the status of the flag FL2 of the area RA5, and if the flag LF2 is at "1", since this indicates that the device 11 is connected to the circuit 56, the CPU 50 detects the levels of the signals P0 to P5 supplied through the terminal unit 56CT after the time T2 has passed. Note that if the flag FL2 is at "0", since this indicates that the keyboard 15 is directly connected to the circuit 56, the CPU 50 detects the levels of the signals P0 to P5 after the time T1 shorter than the time T2 has passed. Thereafter, the CPU 50 increments the variable A by one, and in STEP 2, it checks if the variable A has reached a limit value N. If it is NO in STEP 2, the flow returns to STEP 1. Then, in STEP 1, the CPU 50 sets the next key-out signal SA at LOW level and causes the LOW level key-out signal SA to be generated through connecting terminal unit 56CT. Thereafter, the CPU 50 detects the levels of the key-in signals. When the CPU 50 detects that A=N in STEP 2, it determines that the operation of fetching key data caused by operation of the keys PK00 to PKN5 is completed. Thus, the CPU 50 checks if any one of the key-in signals P0 to P5 includes LOW level data indicating that the keys are actually depressed.

When the CPU 50 detects that any one of the key-in signals P0 to P5 is set at LOW level, it checks if the flag FL2 is at "1" in STEP 3. When the flag FL2 is "0", i.e., when the keyboard 15 is directly connected to the circuit 56, the CPU 50 checks if a memory area for writing data of the area RA3 in the RAM 54 is available. If it is NO in this step, the CPU 50 executes error processing. However, when the status discrimination of the flag FL2 is completed, the CPU 50 sets the variable A at "0", and generates the LOW level signal SA in the same manner as described above. Then, after the time T1 or T2 corresponding to the status of the flag FL2 has passed, the CPU 50 detects the levels of the key-in signals L0 and L1 corresponding to the states of the lock keys.

Thereafter, the CPU 50 increments the variable A by one, and when it is detected that the variable A reaches the value N, in STEP4, the CPU 50 determines that all the data supplied according to the states of the keys LK00 to LKN1 and the keys PK00 to PKN5 have been fetched. Then, the CPU 50 starts to execute a data processing routine shown in FIG. 8. In the data processing routine, when the CPU 50 detects based on the key-in signals L0 and L1 from the lock keys that the control switch 29 is set in the program mode, and detects based on the signals P0 to P5 from the push keys that the data is supplied by operation of the department keys 24, the CPU 50 then determines that the programming operation corresponds to the operation of programming unit prices for respective departments. The CPU 50 sets in the area RA2 of the file RA1 the unit price data for each department supplied by the numeral setting keys 23 which were operated before a key operation of the department key 24. Thereafter, the CPU 50 checks the status of the lock key LK11, i.e., if the print switch 28 is turned on. When the switch 28 is turned on, the CPU 50 determines that the unit price data must be printed. Then, the CPU 50 checks if a memory area for storing the unit price data for each department in the area RA3 is available. When the memory area is not available the CPU 50 causes the printer 16 to print out the data already stored in the memory area RA3 and stores the current unit price data therein.

Figure 10:
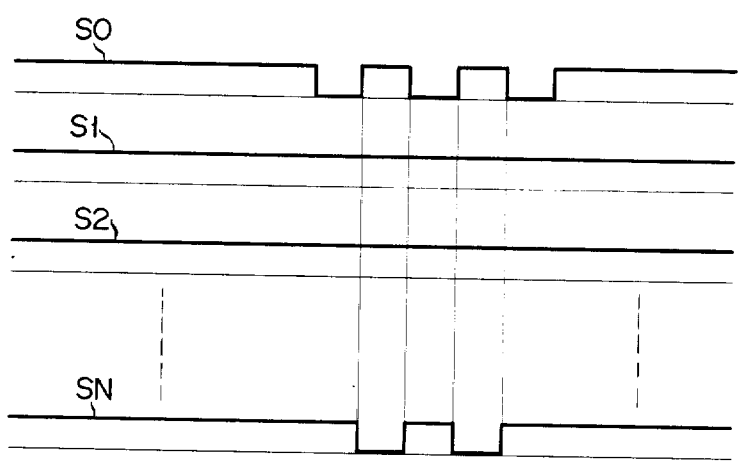

After the unit price for each department is set in the memory area RA2, the CPU 50 determines that the operation of setting one fixed control data in the RAM 54 is completed. Thus, the CPU 50 generates, as a synchronizing signal, a key-in reception signal, which includes the key-out signal S0 having three LOW level pulses of pulse width T3 and the key-out signal SN having two LOW level pulses with the other key-out signals kept at LOW level as shown in FIG. 10. Then, the CPU 50 ends the programming operation for one fixed data. Thereafter, the CPU 50 resets the variable A to "0" and the flow returns to STEP 1.

In the sales registration apparatus having the above arrangement, suppose that the device 11 is connected to the terminal unit 56CT of the circuit 56, as shown in FIG. 1, and that the data setting switch 5 is turned ON to transfer the various fixed control data prestored in the key code area of the RAM 74 of the device 11 to the RAM 54 of the circuit 56. In this case, the key-in reception signal shown in FIG. 10 is supplied to the device 11 every time one fixed control data is supplied to the circuit 56. Therefore, when the device 11 receives the reception signal, since it means that the keyboard control circuit 56 is ready for receiving the next data from the device 11, the fixed control data stored in the key code memory of the RAM 74 can be sequentially and automatically set in the RAM 54 of the cash register 14, thus decreasing the overall time required for data setting. Since the reception signal is generated for each data reception, the data will not be erroneously set.

When the device 11 is connected to the cash register 14, since a time (delay time) after the key-out signals are generated from the circuit 56 until the levels of the key-in signals corresponding to the key-out signals are all detected is set to be longer, data setting can be ensured when the device 11 is used.

The print switch 28 provided on the keyboard 15 of the apparatus can be preset to determine whether or not the data is to be printed on the jounal paper by the printer 16 when fixed control data is set in the RAM 54 of the apparatus. Thus, when fixed control data is set using the device 11, the setting efficiency can be improved by omitting a print out operation.

In a case where the fixed control data from the device 11 is set in the RAM 54 and where the data is to be printed upon setting of the data, the data can be written into the RAM 54 even if the printing data buffer does not have an available area. Then, the data is temporarily stored in the RAM 54, and when an available area is obtained in the buffer, the data is stored therein. Therefore, fixed control data can be reliably stored in the RAM 54.

When the device 11 is connected to the circuit 56, since this can be automatically detected by the key-in signal L1 supplied from the device 11, an erroneous operation can be prevented in the data setting mode.

Figure 11:
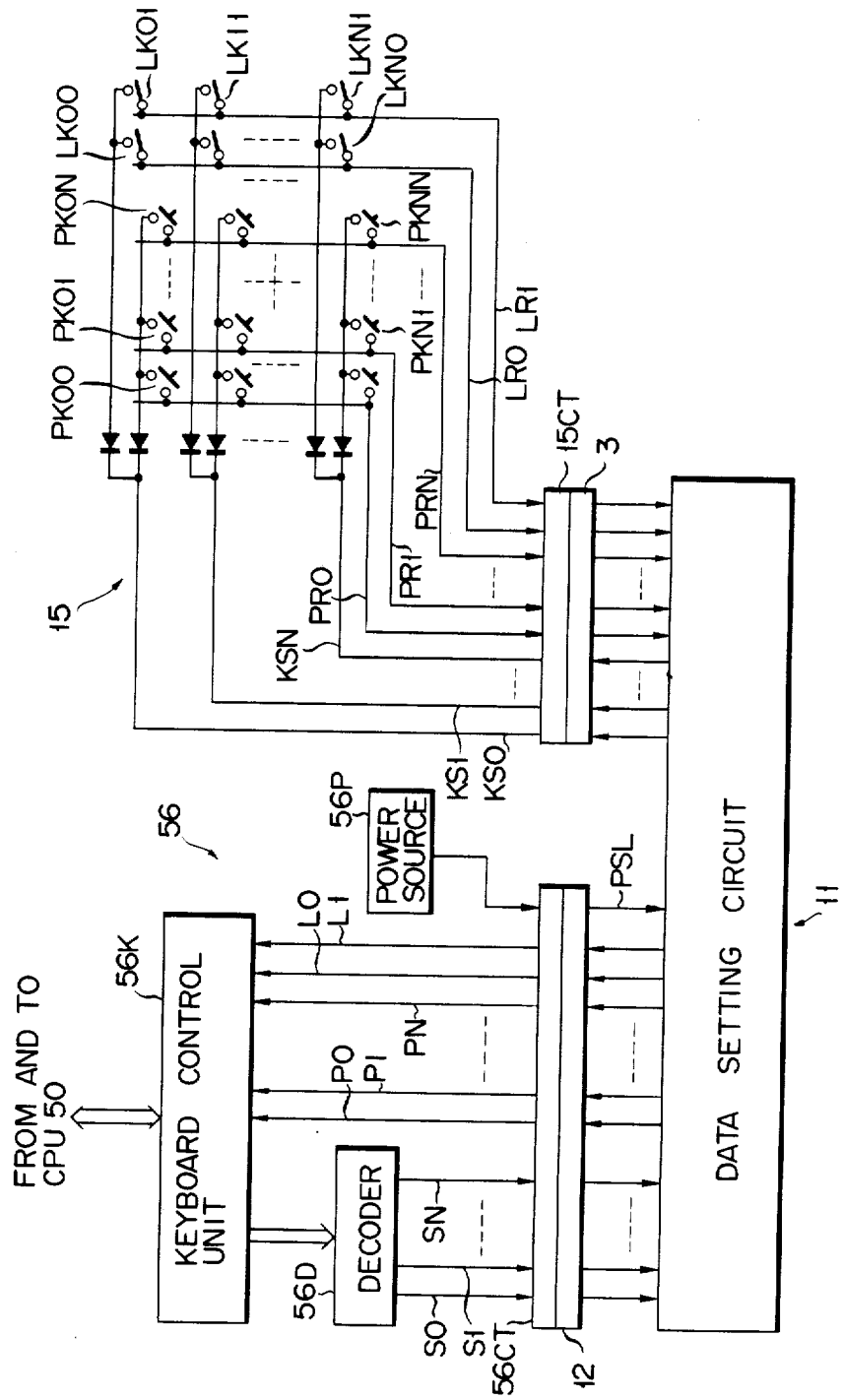
FIGS. 11 and 12 are circuit diagrams of a keyboard, a keyboard control circuit, and a data setting device according to another embodiment of the present invention.
Figure 12:
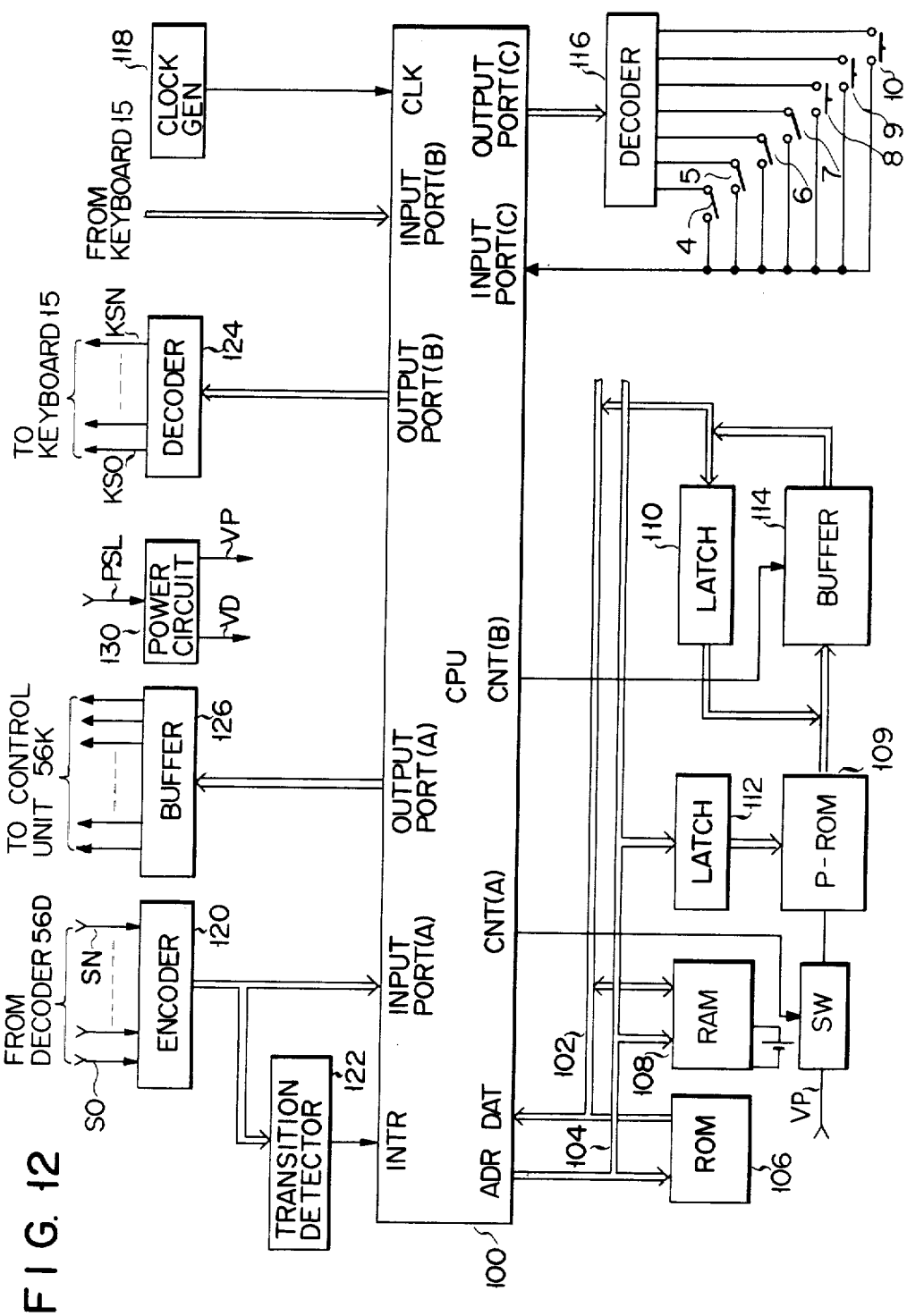

FIG. 11 shows a modification of the keyboard 15, the keyboard control circuit 56 and the data setting device 11 shown in FIG. 6, and FIG. 12 is a detailed circuit diagram of the data setting circuit shown in FIG. 11. In this case, other components such as CPU 50, ROM 52, RAM 54 shown in FIG. 4 can be used in the second embodiment, and the CPU 50 functions in substantially the same manner as described with reference to FIGS. 7A, 7B, 8 to 10. Referring to FIG. 11, a decoder 56D of the circuit 56 generates key-out signals S0 to SN through connecting terminal units 56CT and 12 in accordance with control data from a key control unit 56K. Furthermore, the circuit 56 comprises a power source 56P for supplying a power source voltage to circuit 56 components of the cash register 14 and to a power source line PSL through the terminals 56CT and 12.

As shown in FIG. 12, the device 11 comprises a microprocessor (CPU) 100 including a plurality of input and output ports. A data bus 102 and an address bus 104 of the CPU 100 are connected to a ROM 106 for storing a control program of the device 11 and a RAM 108 for storing data such as key code data supplied from the keyboard 15 of the cash register 14. The buses 102 and 104 are connected to a P-ROM 109 connected to a socket 2 of a casing 1 respectively through latches 110 and 112. A tristate buffer 114 is connected between the P-ROM 109 and the bus 102.

Respective operation switches 4 to 7 and control switches 8 to 10 are connected between an output port (C) and an input port (C) of the CPU 100 through a decoder 116. A clock terminal CLK receives a clock signal from a clock generator 118.

(N+1) key-out signals S0 to SN generated through the keyboard control unit 56K, which is connected to a control unit 50 of the cash register 14 having memories 52 and 54, are supplied to an encoder 120 through the terminal unit 56CT of the cash register 14 and the terminal unit 12 of the device 11. Output data from the encoder 120 is directly supplied to an input port (A) of the CPU 100 and is also supplied to a transition detector 122. When at least one bit of the output data from the encoder 120 is changed, the detector 122 supplies an interrupt signal to an input terminal INTR of the CPU 100 which in turn receives the data from the encoder 120.

Signals corresponding to the output data from the encoder 120 supplied to the input port (A) of the CPU 100 are supplied to a decoder 124 from an output port (B) of the CPU 100. The decoder 124 converts the input signals into (N+1) key-out signals KS0 to KSN having the same waveform as that of the key-out signals S0 to SN from the decoder 56D, and are each supplied through the terminal units 3 of the device 11 and the terminal unit 15CT of the cash register 14 to corresponding commonly connected ends of push keys PK00 to PKNN arranged in an [(N+1)×(N+1)] matrix and lock keys LK00 to LKN1 arranged in an [(N+1)×2] matrix.

Key-in signals PR0 to PRN obtained from the other ends of the push keys PK00 to PKNN and key-in signals LR0 and LR1 obtained from the other ends of the lock keys LK00 to LKN1 are supplied to an input port (B) of the CPU 100 through the terminal units 15CT and 3.

The power source voltage generated from the power source 56P of the cash register 14 is supplied to a power circuit 130 of the device 11 through the terminal units 56CT and 12. A circuit operation voltage VD and a write voltage VP for the P-ROM 109 are generated from the power circuit 130.

Figure 13:
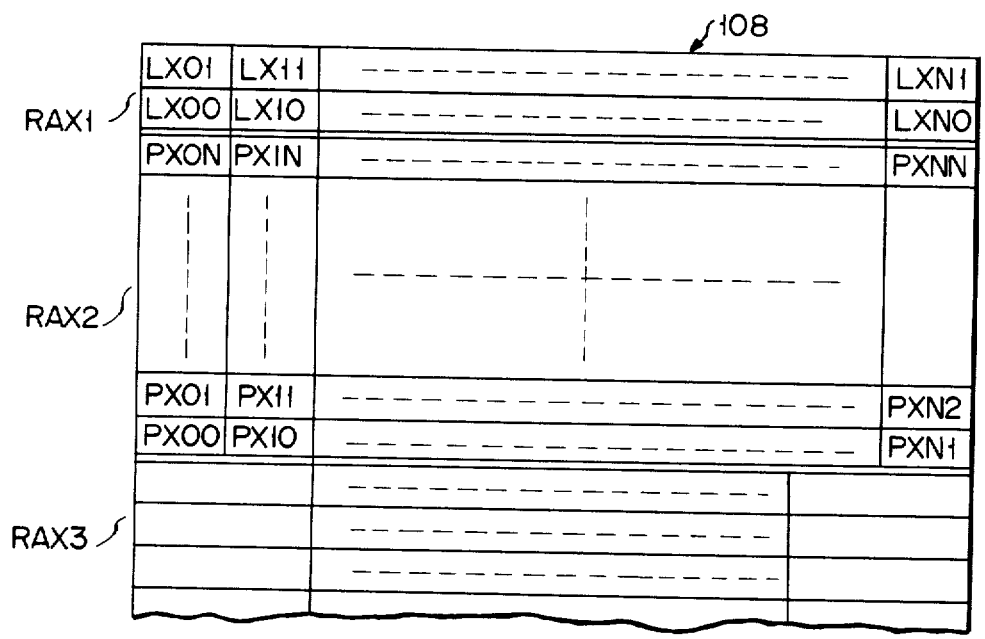
FIG. 13 is a memory map of a RAM of the data setting device shown in FIG. 12.

The RAM 108 includes a key table RAX1 having one-bit memory areas LX00 to LXN1 for storing an operating states of the lock keys LK00 to LKN1 of the keyboard 15 of the cash register 14, a key table RAX2 having one-bit memory areas PX00 to PXNN for storing operating states of the push keys PK00 to PKNN, and a key code memory area RAX3 for sequentially storing key code data each representing the operating states of the respective keys PK00 to PKNN and LK00 to LKN1 obtained in each key operation cycle, as shown in FIG. 13.

Figure 9:
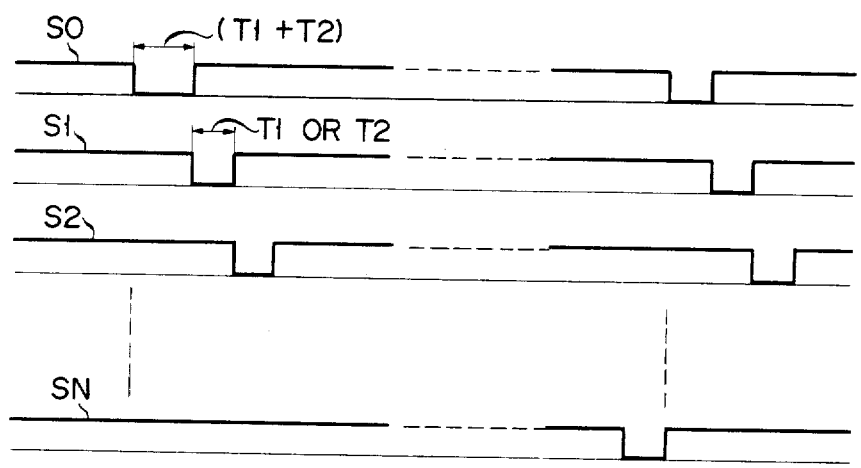
FIGS. 9 and 10 are flow charts for explaining an operation of the control circuit of the cash register shown in FIG. 4.

With this arrangement, (N+1) key-out signals S0 to SN having phases slightly shifted from each other as shown in FIG. 9 are generated from the keyboard control circuit 56 of the cash register 14 through the decoder 56D. The signals S0 to SN are converted into output data EO by the encoder 120 in the data setting device 11, and are supplied to the input port (A) and the transition detector 122. Every time the output data EO is changed, the detector 122 supplies its output pulse signal as the interrupt signal to the input terminal INTR of the CPU 100. In response to the interrupt signal, the CPU 100 receives the data EO and supplies signals corresponding to the output data EO to the decoder 124 from the output port (B). Then, the decoder 124 supplies to the keyboard 15 the key-out signals KS0 to KSN having the same waveform as that of the key-out signals generated from the decoder 56D. Therefore, when the push keys and lock keys are depressed, the key-in signals PR0 to PRN, LR0 and LR1 representing the depressed keys are supplied to the input port (B) of the CPU 100.

In this manner, when various signals are supplied from the circuit 56 and the keyboard 15 of the cash register 14, the CPU 100 of the device 11 executes a data setting operation with respect to the cash register 14 in accordance with the flow chart shown in FIG. 14. More specifically, when the device 11 is powered, the CPU 100 checks if the start (ST) key 8 is depressed. If it is YES in this step, the CPU 100 checks which of the operation switches 4 to 7 is selected, and executes an operation designated by the selected switch. Every time an interrupt signal DO is supplied to the interrupt input terminal INT of the CPU 100, the CPU 100 executes interruption processing.

Figure 15:
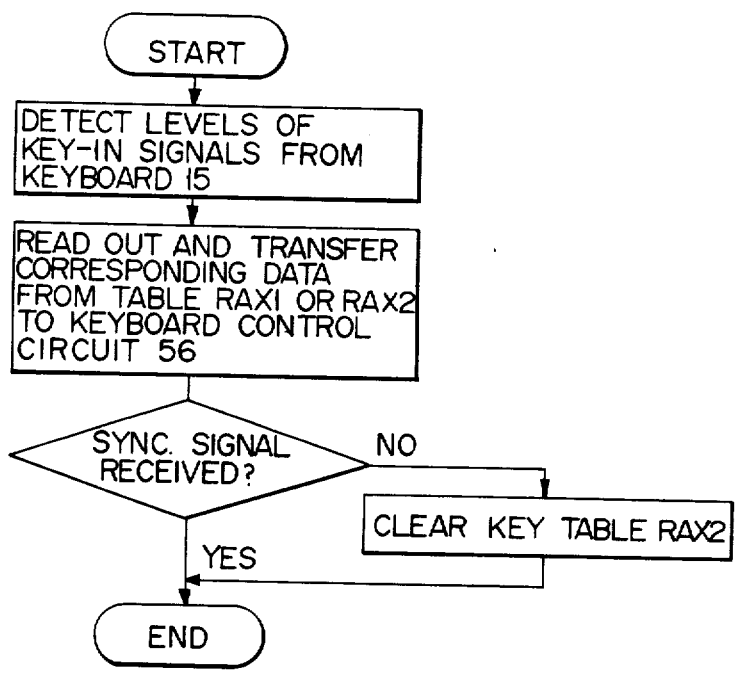

Referring to FIG. 15, when the interrupt signal DO is supplied, the CPU 100 detects the level of the key-in signals supplied to the input port (B) thereof from the keyboard 15, and reads the corresponding data indicating the operating states of the push keys or lock keys from the tables RAX1 and RAX2. The readout data are transmitted from the output port (A) to the keyboard control circuit 56 of the cash register 14 through the buffer 126 and the terminal unit 12 as key-in signals P0 to PN, L0 and L1 having the same waveform as that of the key-in signals PR0 to PRN, LR0 and LR1 from the keyboard 15. When all the key-in signals P0 to PN, L0 and L1 have been transmitted to the circuit 56, the CPU 100 waits for a sync signal indicating reception of the key-in signals. When the sync signal is supplied, the CPU 100 clears the key table RAX2 of the push keys of the RAM 108, and the flow ends.

Figure 16:
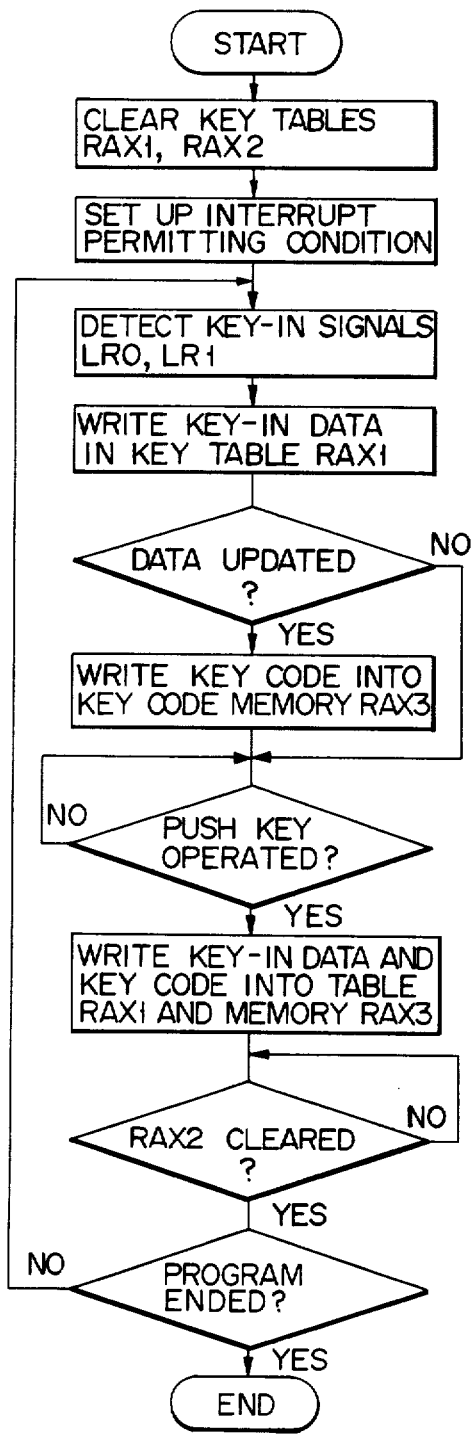

Referring again to FIG. 14, if the depressed operation switch is the program (PR) switch 4, the CPU 100 executes programming process shown in FIG. 16. More specifically, the CPU 100 clears the key tables RAX1 and RAX2 so as to set up an interrupt permitting condition in which interruption processing shown in FIG. 15 can be executed. Then, the CPU 100 detects the ON/OFF state of the lock keys in accordance with the levels of the key-in signals LR0 and LR1 supplied to the input port (B) thereof. For example, when a lock key LKij is turned on, the CPU 100 sets "1" in a corresponding memory area LXij, and when the lock key LKij is turned off, it sets "0" in the memory area LXij. When the key-in data is different from the previous data stored, the CPU 100 determines that the data in this memory area has been updated, and writes the key code in the next available memory area of the key code memory RAX3. Similarly, the CPU 100 checks the ON/OFF states of the push keys in accordance with the key-in signals PR0 to PRN. When a push key PKij is depressed, the CPU 100 sets "1" in a corresponding memory area PXij of the table RAX2, and writes the key code of the corresponding push key in the next available memory area of the key code memory RAX3. Note that, in this case, each time an interrupt signal is generated from the transition detector 122, the CPU 100 writes data correspnding to the levels of the key-in signals PR0 to PRN, or key-in signals LR0 and LRN into the memory areas PXi0 to PXiN, or memory areas LXi0 and LXi1, and writes corresponding key code data into a next available memory area of the memory RAX 3. Then, the CPU 100 stands by until the table RAX2 is cleared by the interruption processing of FIG. 15. When the table RAX2 is cleared, the CPU 100 determines that the key code data corresponding to one key operation has been written in the memory RAX3, and stands by for the next key operation. When all the key operations are completed and the program to be written ends, the flow ends. At this time, a plurality of key code data are stored in the memory RAX3 in a sequence determined by the sequence of the key operations.

Figure 17:
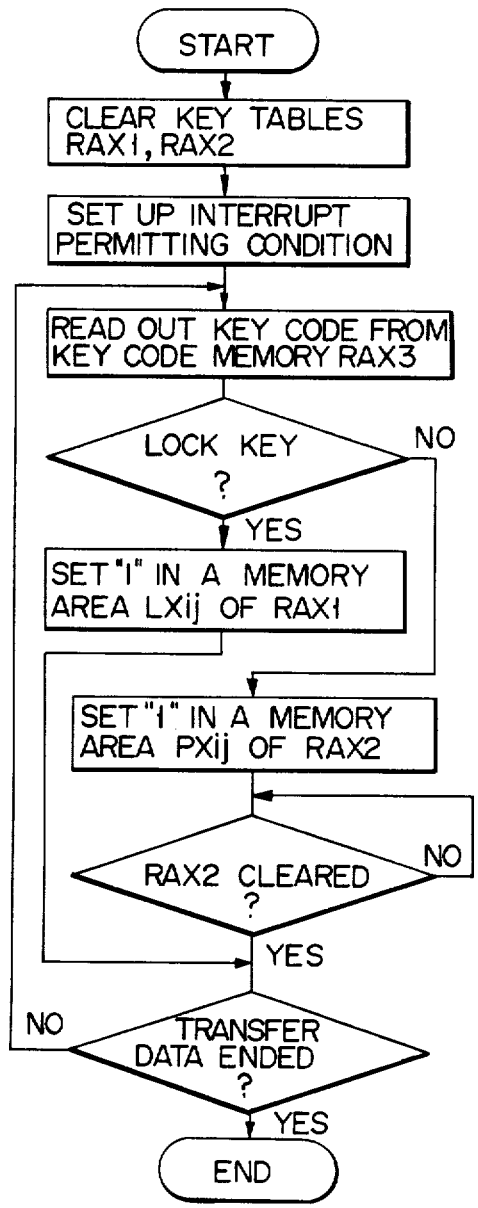

Referring to FIG. 14, when the depressed operation switch is the setting (ES) switch 5 for setting the storage content of the memory RAX3 in the RAM 54 of the register 14, the CPU 100 executes program transferring processing in FIG. 17. In the same manner as in the processing in FIG. 16, the CPU 100 clears the tables RAX1 and RAX2 so as to set them in the interrupt permitting condition, and thereafter reads one key code from the memory RAX3. The readout sequence is the same as the sequence in which the key codes are written in. The CPU 100 checks if the readout key code indicates a lock key. If the key code indicates a lock key, the CPU 100 sets "1" in the corresponding memory area LXij of the table RAX1. However, in this case, when the corresponding memory area is already set at "1", the area is cleared to "0". If the key code does not indicate a lock key, since it indicates a push key, the CPU 100 sets "1" in the corresponding memory area PXij of the table RAX2, and stands by until the table RAX2 is cleared by the interruption processing of FIG. 15. Note that, in this case, each time an interrupt signal is generated, the CPU 100 writes data corresponding to the key code into the memory areas PXi0 to PXiN or memory areas LXi0 and LXi1 and then transfers the data to the CPU 50 of the cash register 14. In this manner, when data corresponding to the key code read out from the memory RAX3 is selectively set in the table RAX1 or RAX2 and is supplied to the circuit 56 of the cash register 14, the CPU 100 reads out the next key code. When all the key codes have been transferred to the circuit 56, the flow ends.

Figure 18:
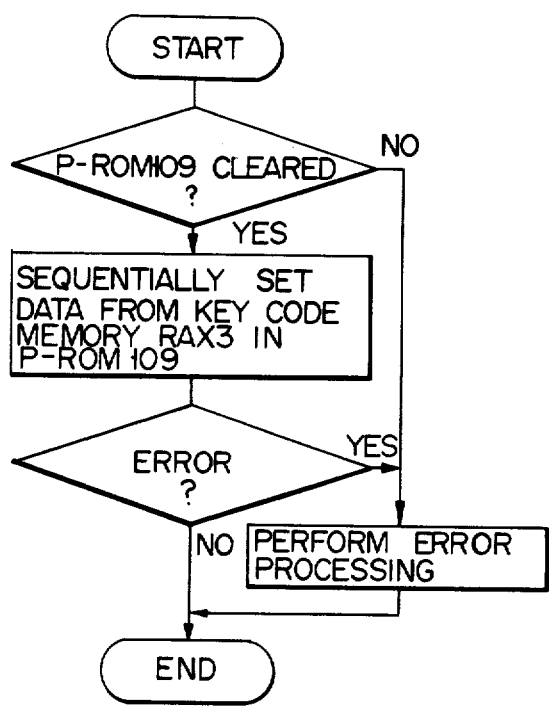

Referring to FIG. 14, when the depressed operation switch is the write (PW) switch 29 indicating a write operation of the storage content of the memory RAX3 in the P-ROM 109, the CPU 100 executes write-in processing for the P-ROM 109 shown in FIG. 18. The CPU 100 checks if the P-ROM 109 is properly connected to the socket 2 of the casing 1 and if the storage content thereof is erased. Thereafter, the CPU 100 sequentially reads out the key codes stored in the memory RAX3 so as to write them in the P-ROM 109. In this case, the voltage VP required for the write operation can be applied to a voltage input terminal of the P-ROM 109 while holding addresses and data in the latches 110 and 112 for a time required therefor. When the write operation of the key codes in the P-ROM 109 is completed, the CPU 100 checks if the codes are normally written, and if there is no error, the flow ends.

Figure 19:
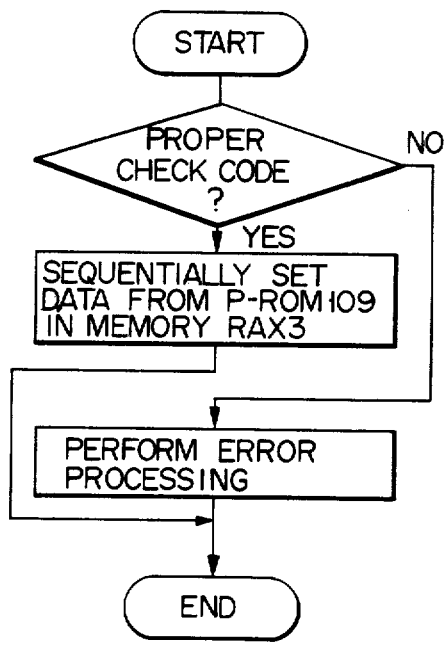

Referring to FIG. 14, when the depressed operation switch is the read (RR) switch 7 indicating a read operation for reading out a program, i.e., the key codes written in the P-ROM 109, the CPU 100 executes the readout processing shown in FIG. 19. The CPU 100 checks that a check code of the P-ROM 109 is correct, and thereafter, reads out the key codes stored in the P-ROM 109 so as to write them in the key code memory RAX3 of the RAM 108. In this case, addesses are supplied through the latch 112, and the buffer 114 is activated by a control signal generated from a control terminal CNT(A), thereby supplying the key codes to the data bus 102 through the buffer 114. In this manner, the CPU 100 fetches the key codes on the data bus 102 and writes them in the memory RAX3 of the RAM 108.

In the data setting device 11, the key-out signals KS0 to KSN supplied to the keyboard 15 of the cash register 14 have substantially the same waveform as that of the key-out signals S0 to SN generated from the circuit 56 of the register 14 through the decoder 56D, and the key-in signals P0 to PN, L0 and L1 supplied to the circuit 56 have substantially the same waveform as that of the key-in signals PR0 to PRN, LR0 and LR1 generated from the keyboard 15. Therefore, when the device 11 is connected, the cash register 14 need not be modified and the control program thereof also need not be changed. Therefore, when the program is directly set in the register 14 and it is written in the device 11, since the key operation of the keyboard 15 can be the same, no specific training for using the device 11 is required. Note that in the above embodiment, the program can be simultaneously set both in the register 14 and the device 11.

Since the keyboard 15 and the keyboard control circuit 56 are detachably connected to each other through the connecting terminals 15CT and 56CT, the device 11 can be easily inserted therebetween, thus decreasing the time required for setting the program.

Once the program is written in the key code memory RAX3 of the RAM 108 of the device 11 by key-in operations from the keyboard 15, the same program can be easily set in the storage unit of another cash register in such a manner that the connecting terminals of the circuit 56 are connected to the terminals 12 of the device 11 and the setting switch 5 is turned on. Therefore, the program need not be set by key-in operations from the keyboard for each cash register. As a result, the total time required for the program setting operation can be shortened, and the setting of erroneous data can be effectively prevented.

In the above embodiments, since the program which is written in the memory RAX3 of the RAM 108 of the device 11 can be written in the P-ROM 109, the basic program can be kept. Furthermore, since the P-ROM 109 is easily detachable from the socket 2 provided on the upper surface of the casing 1, when several types of P-ROMs are prepared, the time for the program setting operation can be further shortened.

Since power for driving respective electronic components is supplied from the cash register 14 to which the program is to be set, the program setting device requires no primary power source circuit of an AC power source, and it can be light in weight and low in cost. Particularly, when the program setting devices are used in an area with a different power source voltage, there is no need to manufacture a plurality of data setting devices corresponding to the power source voltage.

In electronic equipment having a printer such as the cash register 14, when the program is set in the cash register 14 from the device 11, if the printing operation is omitted, the time required for the program setting can be further shortened. Note that while the program is written in the memory RAX3 of the RAM 108 from the keyboard 15, the printing operation for monitoring it can be performed. The lock key data indicating whether or not the program must be printed is set in the control program of the ROM 106, and is converted into key code data so as to be written in the RAM 108 in synchronism with the write operation of the key codes in the RAM 108. Thus, the lock key data is supplied to the cash register 14 together with other key code data.

Note that the present invention is not limited to the above embodiments. For example, a special-purpose keyboard other than keyboard 15 can be connected to the terminal unit 3 of the device 11 so as to generate different key-in signals.

What is claimed is:

1. A sales registration apparatus comprising:

first and second coupling means detachably couplable to each other;

a keyboard means, coupled to said first coupling means and including a numeral key and a department key, for supplying key-in signals through said first coupling means in accordance with a key operation in response to key-out signals supplied from the second coupling means through said first coupling means when the first and second coupling means are coupled to each other;

first memory means;

second memory means for storing key data corresponding to the control program and having substantially the form of said key-in signals;

third coupling means detachably couplable in place of said first coupling means to said second coupling means; and data setting means, coupled to said third coupling means and including second control means for, when the second coupling means is coupled to the third coupling means, sequentially supplying key data from said second memory means through said third and second coupling means in response to key-out signals supplied through said second and third coupling means;

first control means, coupled to said second coupling means, for supplying the key-out signals through said second coupling means and for writing a control program and sales registration data in said first memory means in response to the key-in and key data signals supplied, respectively, through said second coupling means;

whereby signals input to the first control means from the keyboard means and from the second memory means can be processed alike for input to the first memory means due to the the key-in signals and the key data having substantially the same form.

2. An apparatus according to claim 1, wherein said data setting means further includes fourth coupling means coupled to the data setting means and detachably coupable in place of said second coupling means to said first coupling means, and said second control means supplies to said keyboard, when said fourth coupling means is coupled to said first coupling means and said second coupling means is coupled to the third coupling means, output signals corresponding to the key-out signals supplied through said second and third coupling means, causing said keyboard to generate key-in signals in response to the output signals of said second control means, and stores the key-in signals supplied from said keyboard through said first and fourth coupling means in said second memory means as said key data.

3. An apparatus according to claim 2, wherein said keyboard comprises a given key which generates a specified key-in signal of a first level through said first coupling means in response to a specified combination of key-out signals supplied through said first coupling means and designating said given key, and said second control means supplies a specified key-in signal of a second level through said third coupling means in response to the specified key-in signal of the first level.

4. An apparatus according to claim 3, which further comprises a programmable ROM detachably coupled to said second control means, and in which said second control means sequentially reads out data from said second memory means to write the data in said programmable ROM in a P-ROM write-in mode.

5. An apparatus according to claim 3, which further comprises a programmable ROM, detachably coupled to said second control means, for storing key data, and in which said second control means sequentially reads out the key data from said programmable ROM in said second memory means in a P-ROM readout mode.

6. An apparatus according to claim 2, which further comprises a programmable ROM detachably coupled to said second control means, and in which said second control means sequentially reads out data from said second memory means to write the data in said programmable ROM in a P-ROM write-in mode.

7. An apparatus according to claim 2, which further comprises a programmable ROM, detachably coupled to said second control means, for storing key data, and in which said second control means sequentially reads out the key data from said programmable ROM in said second memory means in a P-ROM readout mode.

8. An apparatus according to claim 2, further including operation mode setting means having a plurality of operation mode setting switches, and said second memory means includes a plurality of memory areas for respectively storing data representing states of said plurality of keys of said keyboard and said operation mode setting switches and a memory for sequentially storing key code data corresponding to the data in said plurality of memory areas in each key operation cycle.

9. An apparatus according to claim 2, wherein said data setting means supplies the key-in signals to said first control means through said third and second coupling means.

10. An apparatus according to claim 1, further including operation mode setting means having a plurality of operation mode setting switches, and said second memory means includes a plurality of memory areas for respectively storing data representing states of said plurality of keys of said keyboard and said operation mode setting switches and a memory for sequentially storing key code data corresponding to the data in said plurality of memory areas in each key operation cycle.

11. An apparatus according to claim 1, wherein said keyboard comprises an a given key which generates a specified key-in signal of a first level through said first coupling means in respons to a specified combination of key-out signals supplied through said first coupling means and designating said given key, and said second control means supplies a specified key-in signal of a second level through said third coupling means in response to the specified key-in signal of the first level.

12. A sales registration appartus comprising:
first and second coupling means detachably coupled to each other;
a keyboard, coupled to said first coupling means and including a numeral key and a department key, for supplying key-in signals through said first coupling means in accordance with a key operation in response to key-out signals supplied through said first coupling means;
first memory means;
first control means, coupled to said second coupling means, for supplying the key-out signals through said second coupling means and for writing a control program and sales registration data in said first memory means in response to the key-in signals supplied through said second coupling means;
second memory means for storing key data corresponding to the control program;
operation mode setting means;
third coupling means detachably coupled to said second coupling means;
data setting means, coupled to said third coupling means and including second control means for sequentially supplying key data from said second memory means through said third and second coupling means in response to the key-out signals supplied through said third coupling means, thereby permitting said first control means to write the key data in said first memory means;
wherein said data setting means further includes fourth coupling means detachably coupled to said first coupling means, and said second control means supplies in a second operation mode, to said keyboard output signals corresponding to the key-out signals supplied through said second and third coupling means, causing said keyboard to generate key-in signals in response to the output signals of said second control means, and stores the key-in signals supplied from said keyboard through said first and fourth coupling means in said second memory means; and
wherein said operation mode setting means includes a plurality of oepration mode setting switches, and said second memory means includes a plurality of memory areas for respectively storing data representing states of said plurality of keys of said keyboard and said operation mode setting switches and a memory for sequentially storing key code data corresponding to the data in said plurality of memory areas in each key operation cycle.

13. A sales registration apparatus comprising:
first and second coupling means detachably coupled to each other;
a keyboard, coupled to said first coupling means and including a numeral key and a department key, for supplying key-in signals through said first coupling means in accordance with a key operation in response to key-out signals supplied through said first coupling means;
first memory means;
first control means, coupled to said second coupling means, for supplying the key-out signals through said second coupling means and for writing a control program and sales registration data in said first memory means in response to the key-in signals supplied through said second coupling means;
second memory means for storing key data corresponding to the control program;
operation mode setting means;
third coupling means detachably coupled to said second coupling means;
data setting means, coupled to said third coupling means and including second control means for sequentially supplying key data from said second memory means through said third and second coupling means in response to the key-out signals supplied through said third coupling means, thereby permitting said first control means to write the key data in said first memory means; and
wherein said operation mode setting means includes a plurality of operation mode setting switches, and said second memory means includes a plurality of memory areas for respectively storing data representing states of said plurality of keys of said keyboard and said operation mode setting switches and a memory for sequentially storing key code data corresponding to the data in said plurality of memory areas in each key operation cycle.

* * * * *